(12) United States Patent
Tokuyama et al.

(10) Patent No.: US 6,414,821 B1
(45) Date of Patent: Jul. 2, 2002

(54) MAGNETIC HEAD SUPPORT MECHANISM AND MAGNETIC DISK DRIVE

(75) Inventors: Mikio Tokuyama, Tsukuba; Yukio Kato; Hiromitsu Tokisue, both of Chiyoda; Junichi Matsuno, Tsuchiura, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/516,234

(22) Filed: Mar. 1, 2000

(30) Foreign Application Priority Data

Mar. 4, 1999 (JP) .......................................... 11-056618

(51) Int. Cl.[7] ............................. G11B 5/54; G11B 21/22
(52) U.S. Cl. ................................................... 360/254.8
(58) Field of Search ........................... 360/254.8, 254.7, 360/254.9, 255.6, 255.7, 255.8, 97.01, 98.01

(56) References Cited

U.S. PATENT DOCUMENTS

| | | | | |
|---|---|---|---|---|
| 4,420,780 A | | 12/1983 | Deckert | ................... 360/235.8 |
| 5,526,206 A | * | 6/1996 | Shimizu | ................... 360/254.8 |
| 5,864,448 A | * | 1/1999 | Berberich | ................ 360/254.8 |
| 6,067,209 A | * | 5/2000 | Aoyagi et al. | ........... 360/254.7 |
| 6,201,666 B1 | * | 3/2001 | Resh | ........................ 360/255.9 |
| 6,226,154 B1 | * | 5/2001 | Albrecht | ................... 360/254.8 |

FOREIGN PATENT DOCUMENTS

JP          8-255320          10/1996

* cited by examiner

*Primary Examiner*—David Hudspeth
*Assistant Examiner*—Angel Castro
(74) *Attorney, Agent, or Firm*—Antonelli, Terry, Stout & Kraus, LLP (57) ABSTRACT

When a negative pressure slider is used in the magnetic head support mechanism with a loading/unloading function, the gimbals is likely to be deformed or damaged. Apart from the first tab provided to the front end of the suspension, the second tab is provided to the front end of the gimbals. In addition to the Suspension supporting ramp, the ramp portion has the second ramp for supporting the gimbals. This arrangement allows the slider mounting gimbals, in addition to the suspension, to be loaded/unloaded. Unlike the conventional drive in which only the suspension is loaded/unloaded, this arrangement enables the gimbals to be loaded/unloaded while maintaining a predetermined space between the gimbals and the suspension, thus reducing the risk of gimbals deformation and damage.

8 Claims, 9 Drawing Sheets

MAGNETIC HEAD SUPPORT MECHANISM AND MAGNETIC DISK DRIVE

BACKGROUND OF THE INVENTION

The present invention relates to a magnetic head support mechanism for a magnetic disk drive and more particularly to a magnetic head support mechanism with a loading/unloading mechanism which reduces deformations of and damages to a gimbals during unloading and has excellent impact resistance during operation.

In a magnetic disk drive with a conventional loading/unloading mechanism, as disclosed in JP, 8-255320, A a tab provided to the front end of a suspension rides over an inclined portion of a parking mechanism when a disk stops, thereby preventing a contact between a slider and a disk. This eliminates a problem of the slider sticking to the disk due to their contact (the slider and the disk get stuck together, resulting in the disk failing to rotate or the slider failing to float).

To realize a uniform floating distance (height of the slider from the disk surface) over the entire surface of the disk, the slider of recent years employs a negative pressure. The slider using a negative pressure (referred to as a negative pressure slider), as disclosed in U.S. Pat. No. 4,420,780, has a pocket formed in that surface of the slider facing the disk to generate a pressure lower than the atmospheric pressure (negative pressure) to make uniform the floating force that would otherwise vary depending on the position along the disk radius, thereby achieving a uniform floating distance.

A problem addressed by the present invention is that, where the conventional negative pressure slider is used as the suspension for the loading/unloading mechanism, the slider stays on the disk surface due to the negative pressure while in an unloaded state and the application of a separation force overcoming the negative pressure may deform the gimbals.

OBJECT AND SUMMARY OF THE INVENTION

An object of the present invention is to prevent the gimbals of the suspension from being deformed and damaged during unloading.

To achieve the above objective, the magnetic head support mechanism, which has a magnetic head carrying slider and a suspension that holds the slider against the disk surface from the back of the slider (i.e., from the side opposite the disk facing side), is characterized in that the suspension has a gimbals (also called a flexure) and a load beam and that the load beam is provided at its front end with a first tab and the gimbals is provided at its front end with a second tab. Outside the disk of the magnetic disk drive, a loading/unloading inclined portion (hereinafter referred to as a ramp) is provided. The ramp has a first ramp and a second ramp corresponding to the first tab and the second tab. During the loading/unloading operation, the first tab pulls the load beam away from the disk surface and the second tab pulls the slider away from the disk surface. This allows the loading/unloading operation to be carried out without deforming the gimbals even when the negative pressure slider is used.

Further, the friction of sliding portions as well as dust produced in the sliding portions can be reduced by applying a lubricating film or lubricating agent to one or both of sliding surfaces between the first tab and the first ramp and between the second tab and the second ramp, or by forming the sliding surfaces from a material excellent in the lubrication performance. With this arrangement, dust no longer adheres to the slider or causes floating height variations, assuring high reliability.

Further, the ramp is formed so that the second ramp begins at a position behind where the first ramp begins. So, when the disk rotation stops, the first tab and the first ramp contact first, followed by the contact between the second tab and the second ramp. In other words, the first tab lifts the load beam first and then the second tab lifts the slider. Therefore, the slider can be pulled up with a zero slider pressing load.

As a result, the slider can easily be pulled up and the wear of the second ramp can be reduced. During the loading operation, the slider is first lowered (or loaded) onto the disk surface and is then applied with a load. It is therefore possible to prevent damages which would otherwise be caused by the slider contacting the disk.

Because the first tab is formed longer than the second tab, the second ramp does not need to be formed directly below the first ramp. In other words, the second ramp can be formed by the side of the first ramp, which enables the ramp to have a sufficient strength.

DESCRIPTION OF THE PREFERRED EMBODIMENTS

The first embodiment of the present invention will be described by referring to FIG. 1 through FIG. 7. To explain about the operational or performance difference between a conventional magnetic head support mechanism and a mechanism of the invention, structural differences between these magnetic head support mechanisms are shown in FIG. 6.

Figure 1:
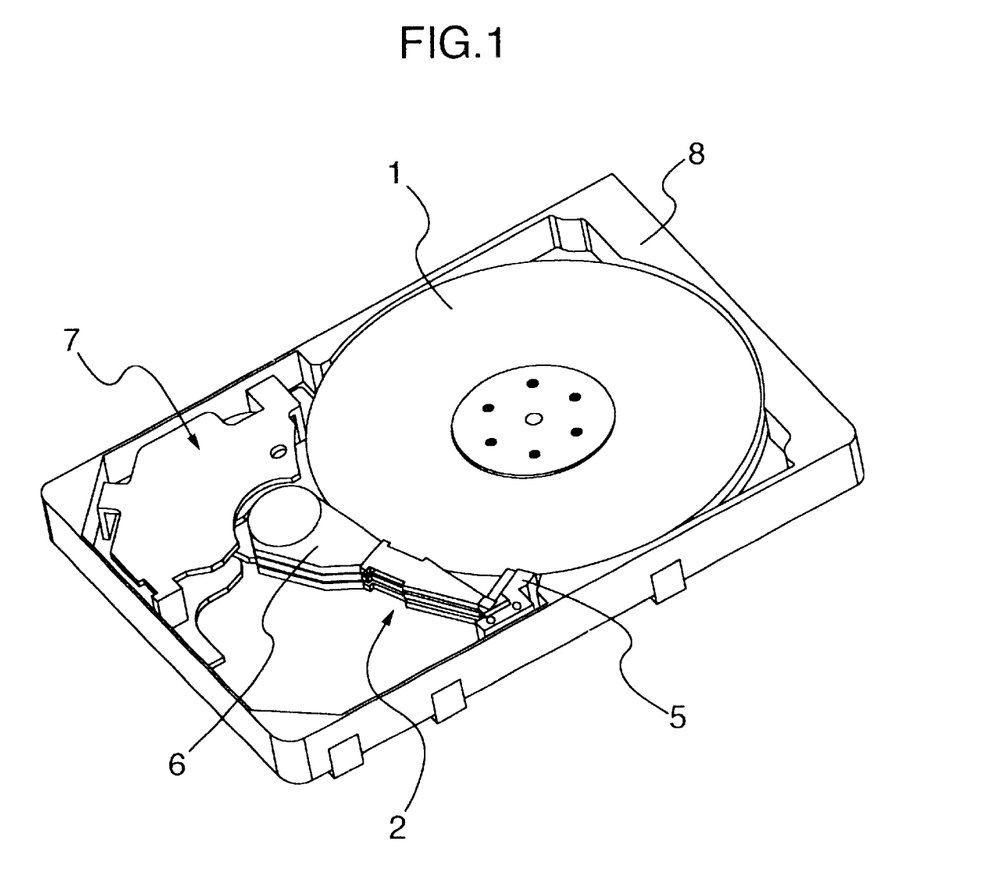
FIG. 1 is a perspective view showing an overall construction of the magnetic disk drive of the present invention.

FIG. 1 shows an overall view of a magnetic disk drive mounting the magnetic head support mechanism of the invention.

Magnetic disks 1 for recording information are mounted in layers on a spindle. A magnetic head (not shown) for recording and reproducing information onto and from the magnetic disk 1 is mounted on a slider (not shown) of a magnetic head support mechanism 2. The magnetic head support mechanism 2 is connected to an arm 6. The magnetic head is positioned at a predetermined radial position by a positioning mechanism 7 including a pivot, a bearing and a voice coil motor. These mechanisms are accommodated in a lunchbox-shaped base 8 and sealed by a cover (not shown). The magnetic head support mechanism 2, when the disk is at rest, has its front end supported on a ramp 5 which is provided outside the magnetic disk 1.

Figure 2A:
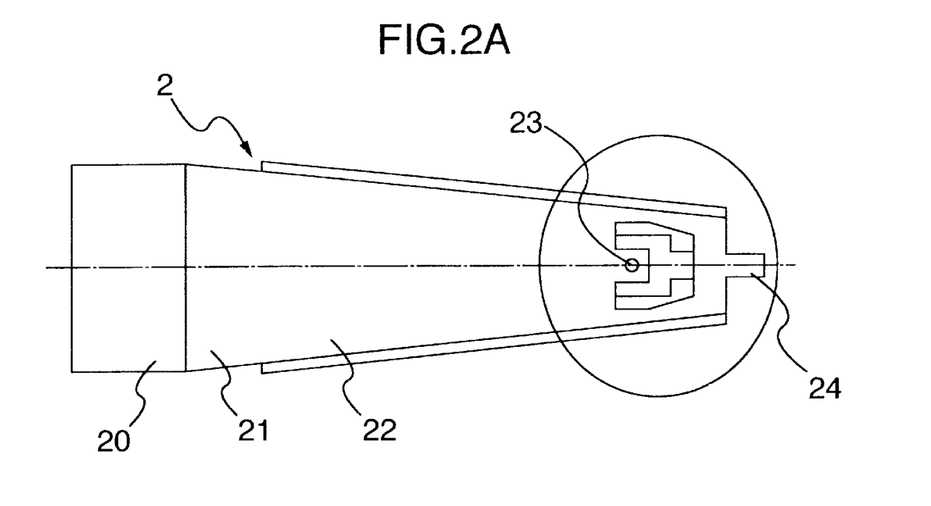
FIG. 2A is a plan view showing the magnetic head support mechanism of a first embodiment of the invention.

FIG. 2A shows an overall view of the magnetic head support mechanism as the first embodiment of the invention.

Figure 2B:
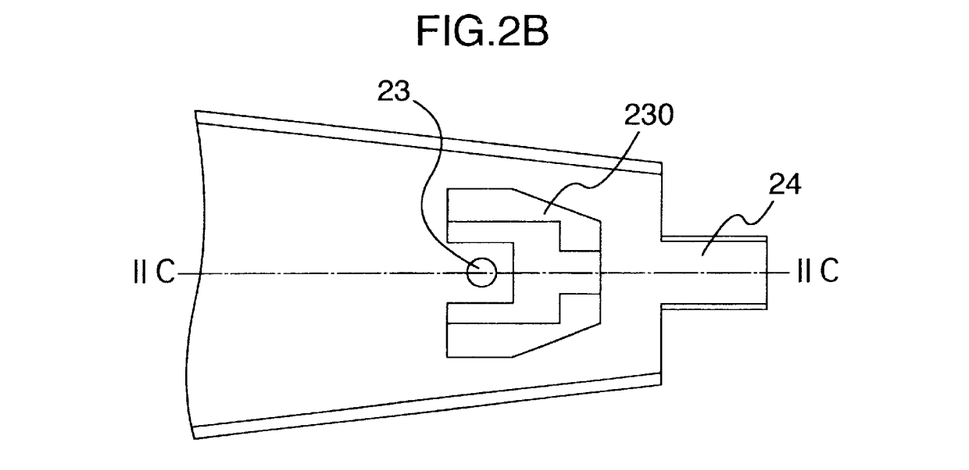
FIG. 2B is an enlarged view of an encircled part of FIG. 2A.

An arm mounting portion 20 is connected to a spring portion 21, which in turn is connected to a load beam 22. The front end of the load beam 22 is provided with a pivot 23 and a first tab 24. FIG. 2B shows an enlarged view of a portion A of FIG. 2A. Around the pivot 23 is formed a window 230, through which a part of a slider mounting gimbals 31 shows. This window 230 is used to insert a jig for gripping the gimbals or slider to weld the slider to the gimbals.

Figure 2C:
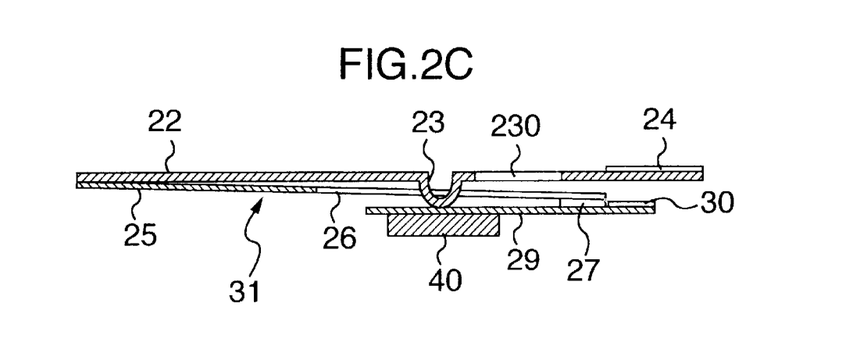
FIG. 2C is a cross section taken along the line IIC—IIC of FIG. 2B.

FIG. 2C shows a cross section taken along the line IIC—IIC.

A joint portion 25 of the gimbals 31 is welded at one end to the load beam 22 and at the other end is connected to a flexible finger portion 26, which has a step portion 27, a lateral frame 28, a mounting portion 29 and a second tab 30. The mounting portion 29 is attached with a slider 40 and applied with a pressing load from a side opposite the slider 40 by the pivot 23.

The first tab 24 is provided at the front end of the load beam 22 and the second tab 30 at the front end of the gimbals 31. The second tab 30 is located below the first tab 24 (i.e., on the slider side) without contacting it. The second tab 30 is formed shorter than the first tab 24. In this example, the difference in length between the two tabs is called L. The gimbals 31 is also kept out of contact, except at one end of the joint portion 25, with the load beam 22 and the first tab 24.

Figure 3A:
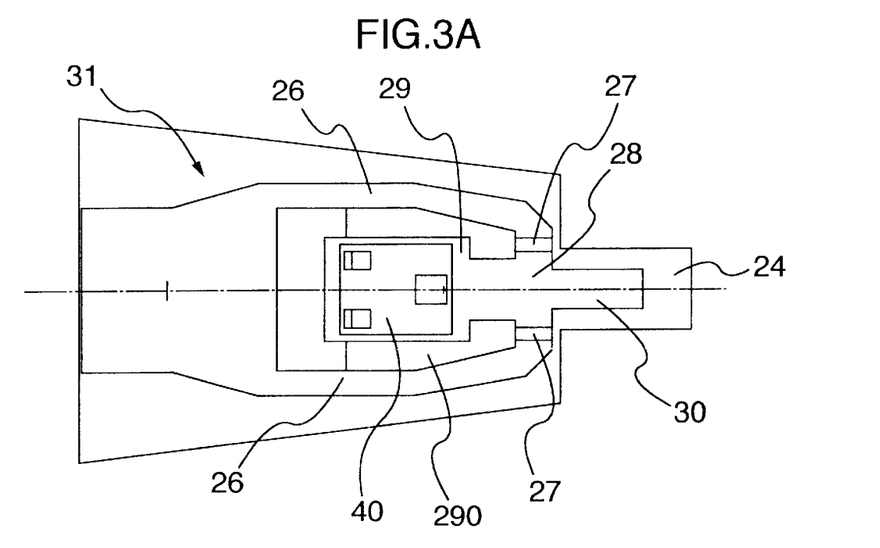
FIG. 3A is a plan view showing a gimbals of the first embodiment installed in place.

FIG. 3A shows the slider mounting side of the portion A of FIG. 2A.

As shown in the figure, the slider 40 is mounted on the mounting portion 29 of the gimbals 31. The other end of the mounting portion 29 is connected to the lateral frame 28, which has its ends connected to the step portion 27 which in turn is connected to the flexible finger portion 26. The second tab 30 is formed by extending the lateral frame 28 in a direction opposite the slider 40.

Figures 3B, 3C:
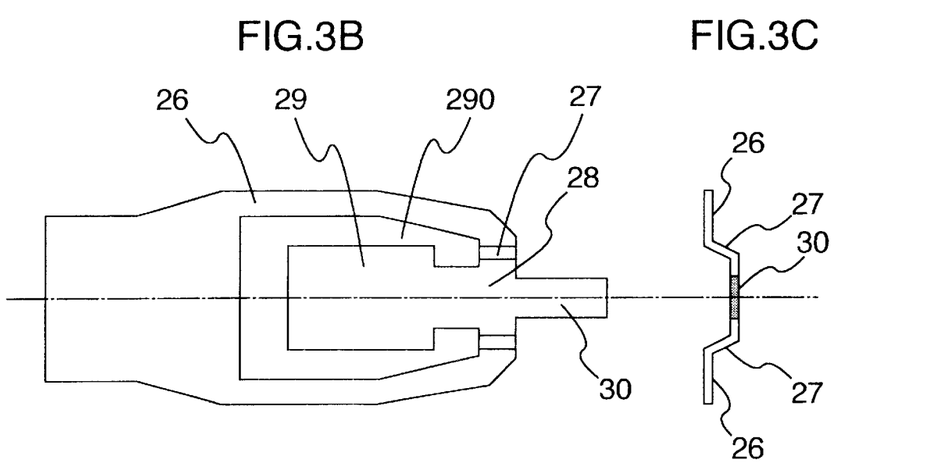
FIG. 3B is a plan view of the gimbals.
FIG. 3C is a front view of the gimbals.
Figure 3D:
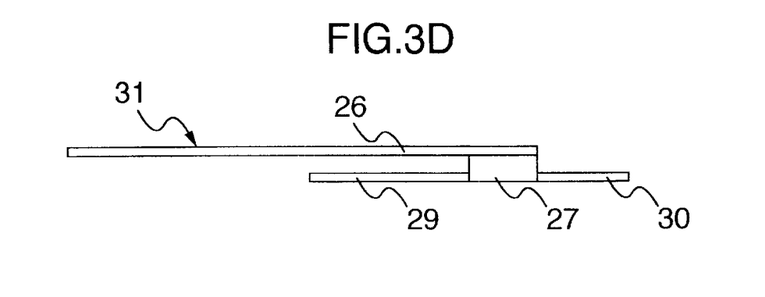
FIG. 3D is a side view of the gimbals.

FIG. 3B shows the detail of the gimbals 31 attached with the second tab 30. FIG. 3C shows the gimbals as seen from its end and FIG. 3D shows the cross section of the gimbals cut along the center line.

As shown in these figures, the mounting portion 29, the lateral frame 28 and the second tab 30 are formed on almost the same plane. The height of the flexible finger portion 26 from these portions is determined by the height of the step portion 27. The second tab 30 may be bent in U shape to improve its mechanical strength.

Figure 4:
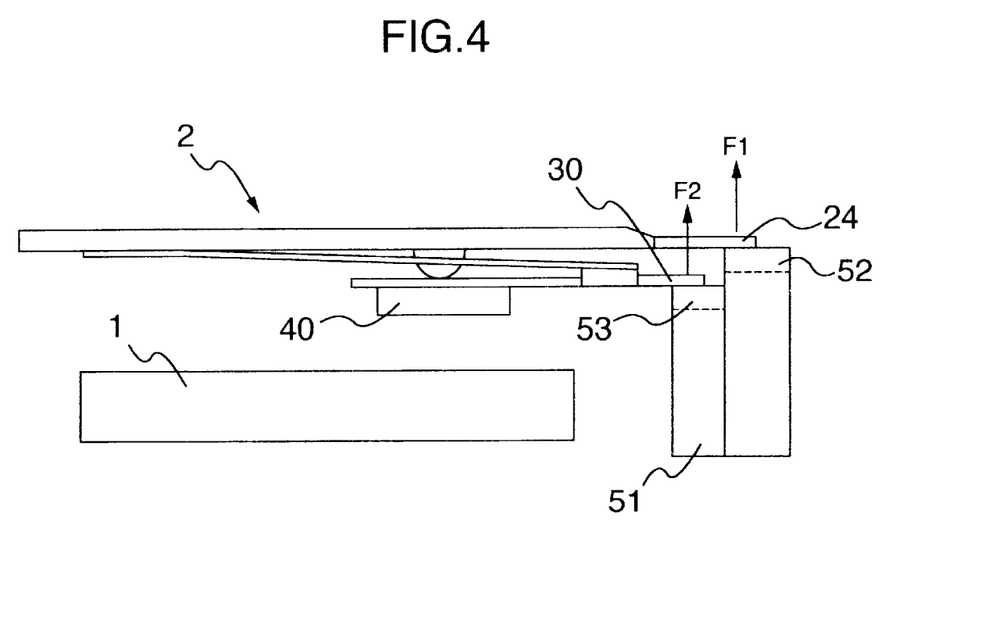
FIG. 4 is a side view showing the first embodiment at rest.

FIG. 4 shows the magnetic head support mechanism 2 pulled away from the disk surface by the loading/unloading inclined surface (hereinafter referred to as a ramp 51) (in an unloaded state). The ramp 51 is formed with a first ramp 52 and a second ramp 53. The first tab 24 is applied a separation force F1 from the first ramp 52 and the second tab 30 is applied a separation force F2 from the second ramp 53, with the result that they are unloaded from the disk surface.

Figure 5A:
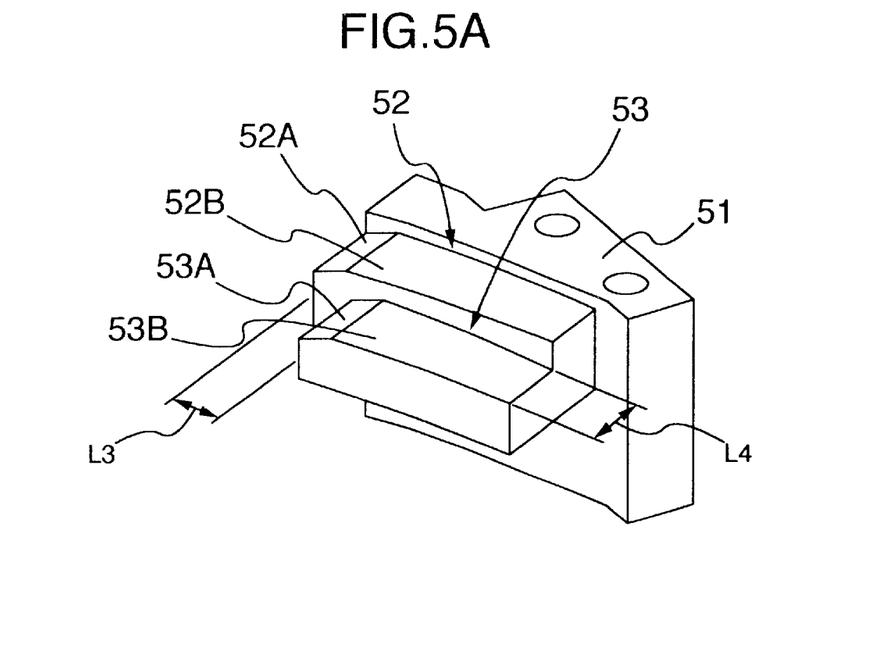
FIG. 5A is a perspective view of a ramp of the invention.
Figure 5B:
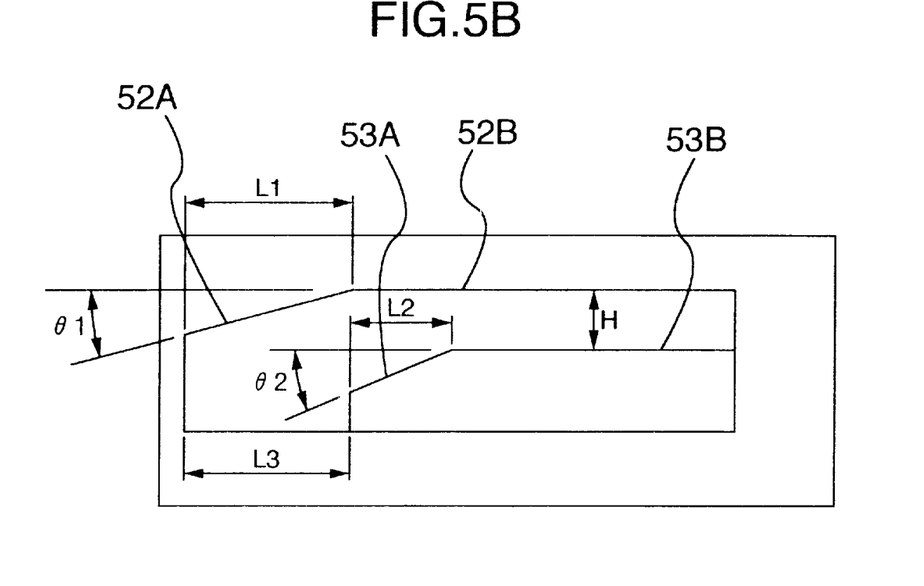
FIG. 5B is a side view of the ramp of FIG. 5A.
Figure 6A:
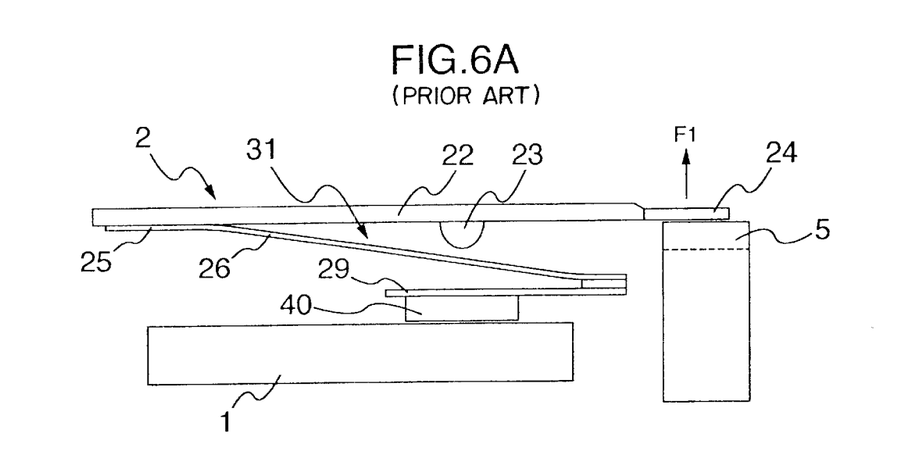
FIG. 6A is a side view showing a conventional gimbals structure resting on the ramp.
Figure 6B:
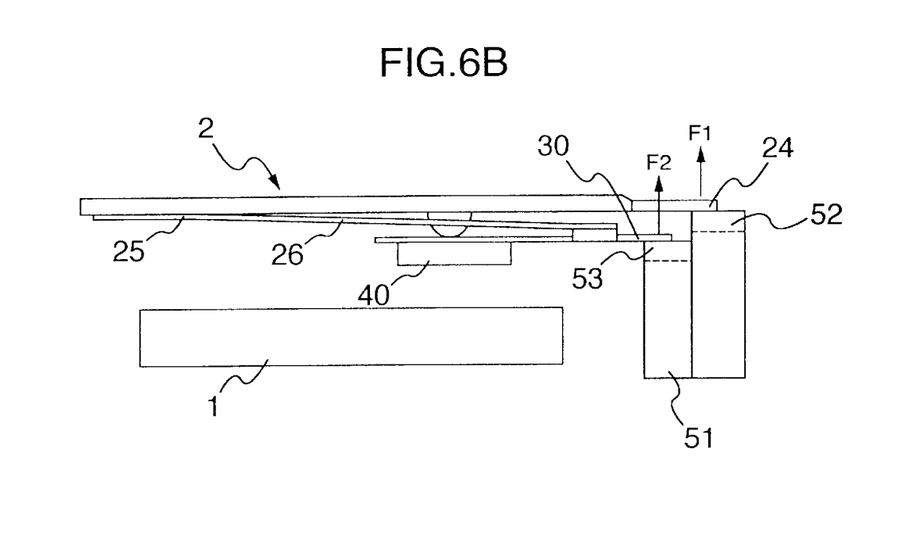
FIG. 6B is a s id e view showing a gimbals structure of the invention resting on the ramp.

FIG. 5A shows the detail of the ramp and FIG. 5B shows the difference in dimension between the first ramp and the second ramp.

As described above, the ramp 51 has two ramps, first ramp 52 and second ramp 53. The first ramp 52 has an inclined portion 52A and a flat portion 52B. The second ramp 53 similarly has an inclined portion 53A and a flat portion 53B. As the disk rotation stops, the first tab and the second tab of the magnetic head support mechanism are pulled away from the disk surface by the inclined portions 52A, 53A and held on the flat portions 52B, 53B. The flat portions may be formed with a recess or inclination to securely hold the tab. The second ramp is provided nearer to the magnetic head support mechanism 2 than the first ramp by a distance of about L3 and the width of the second ramp is provided by a distance of L4. This is due to the difference in length L between the first tab and the second tab. The height difference H between the flat portion of the first and second ramps is set almost equal to the height difference H between the first and second tabs. These arrangements combine to prevent the deformation of gimbals during unloading.

FIG. 5B details the difference between the first ramp and the second ramp. Changing the positional difference L3 between the first ramp and the second ramp can adjust the unloading/loading timings of the suspension and the slider. In this embodiment, the second ramp is provided a distance L3 behind the first ramp. With this arrangement, during the unloading operation, the suspension is first pulled away from the disk surface, followed by the slider. This allows the slider to be pulled away from the disk surface with a zero slider load, which in turn can reduce variations of the floating height of the slider and damages to the disk caused when the slider contacts the disk (because of the zero load).

Further, changing inclination angles $\theta 1$, $\theta 2$ and lengths L1, L2 of the inclined portions of the first and second ramps allows the loading/unloading conditions of the suspension and the slider to be controlled desirably. For example, if the inclination angle $\theta 2$ of the second ramp is reduced, the slider can be loaded or unloaded slowly onto or from the disk surface. This in turn can reduce damages to the slider and the disk surface that may be caused during the loading/unloading operation.

In the conventional magnetic head support mechanism, as shown in FIG. 6A, there is one tab 24 at the tip of the support mechanism and one ramp 5. Hence, in the case of the negative pressure slider, even when the tab 24 is lifted by the ramp 5, the slider 40 remains on the disk surface due to the negative pressure. The suspension 2 on the other hand is pulled away from the disk surface, so the flexible finger portion 26 of the gimbals 31 deforms, giving rise to a problem that the slider 40 cannot be lifted stably.

In the present invention, as shown in FIG. 6B, the second tab 30 and the second ramp 53 combine to prevent the slider 40 from remaining on the disk surface and deforming the flexible finger portion 26 during unloading even when the negative pressure slider is used.

To eliminate the drawback of the conventional support mechanism, it may be possible to adopt a construction that has a hook extending upward from the slider mounting portion to above the load beam. When the load beam is pulled away from the disk surface by the tab, the hook engages the load beam and lifts the slider at the other end of the hook from the disk surface. As a result, the gimbals deformation problem does not occur. However, an impact test during operation (conducted with the slider floating over the rotating disk), which has gained importance in recent years, has found that impacts may vibrate the load beam and cause the hook to engage the load beam, disturbing the floating attitude of the slider, which may in turn cause damages to the disk. When the hook is not used on the other hand, such a problem is not likely to occur.

Figure 7A:
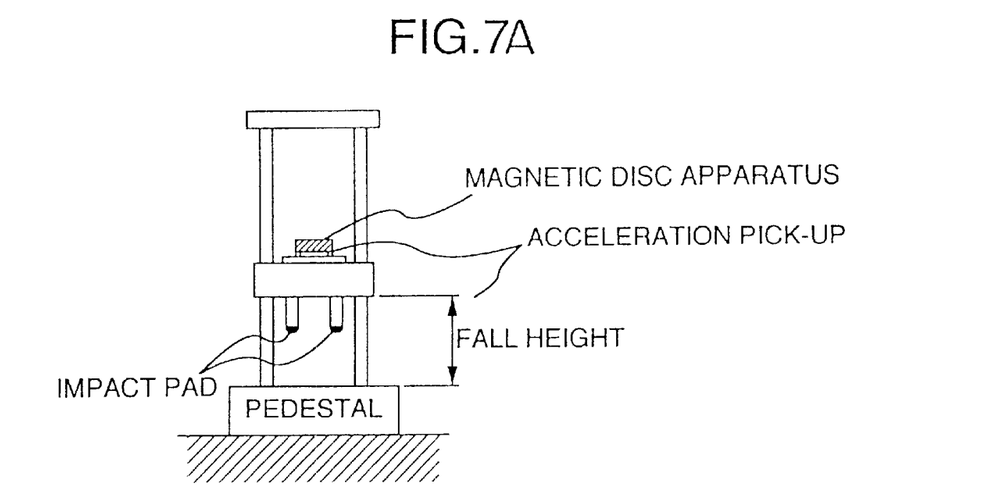
FIG. 7A is a schematic view of an impact tester.
Figure 7B:
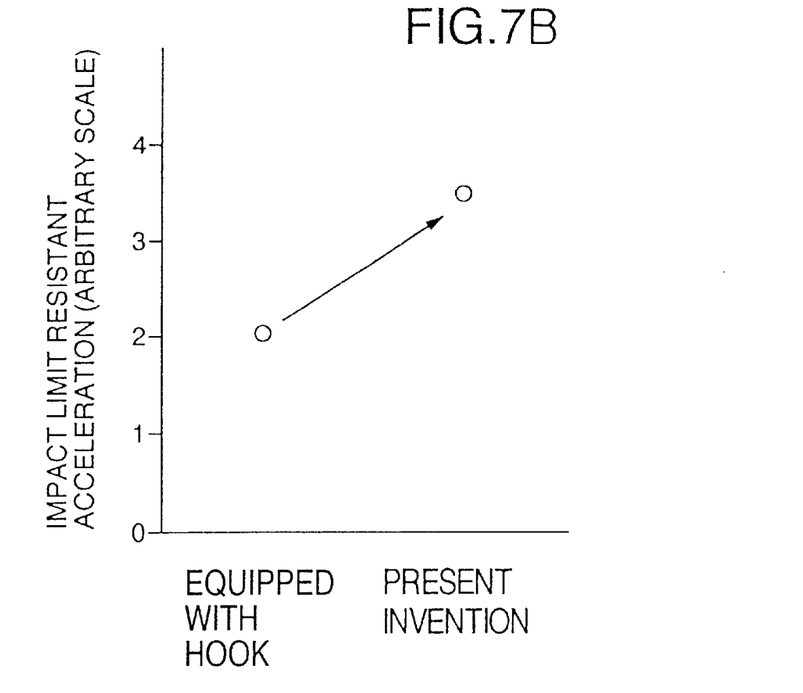
FIG. 7B is a graph of impact test results.

An impact tester as shown in FIG. 7A was used to determine an impact resistance limit acceleration and the test result is shown in FIG. 7B.

Comparison of the impact resistance limit accelerations indicates, as shown in FIG. 7B, that the present invention improves the limit performance over the support mechanism using the hook.

Figure 8:
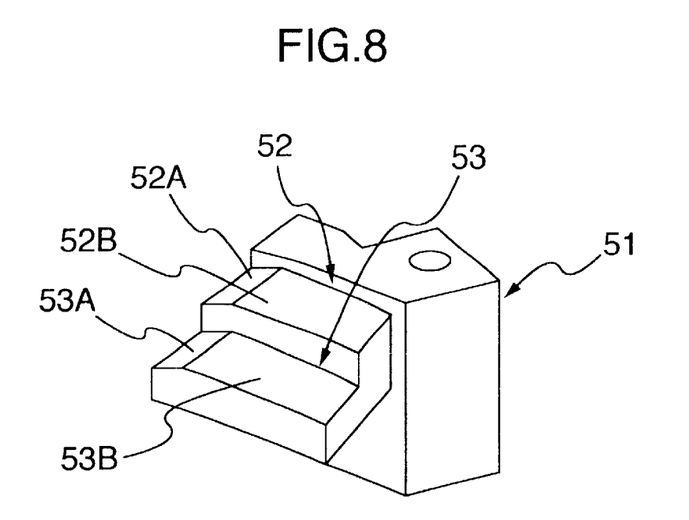
FIG. 8 is a perspective view showing another ramp of the invention.

A second embodiment of the present invention will be described by referring to FIG. 8. In this embodiment the starting positions of the inclined portions of the first and second ramps are aligned (L3 in FIG. 4C is set to 0) and the lengths of the ramps are set shorter. This enables a reduction in the size of the ramp, an increase in the data surface of the magnetic disk, and a reduction in the size of the magnetic disk drive. In this embodiment, too, the second tab and the second ramp combine to lift the slider away from the disk surface, preventing the gimbals from being damaged.

Figure 9:
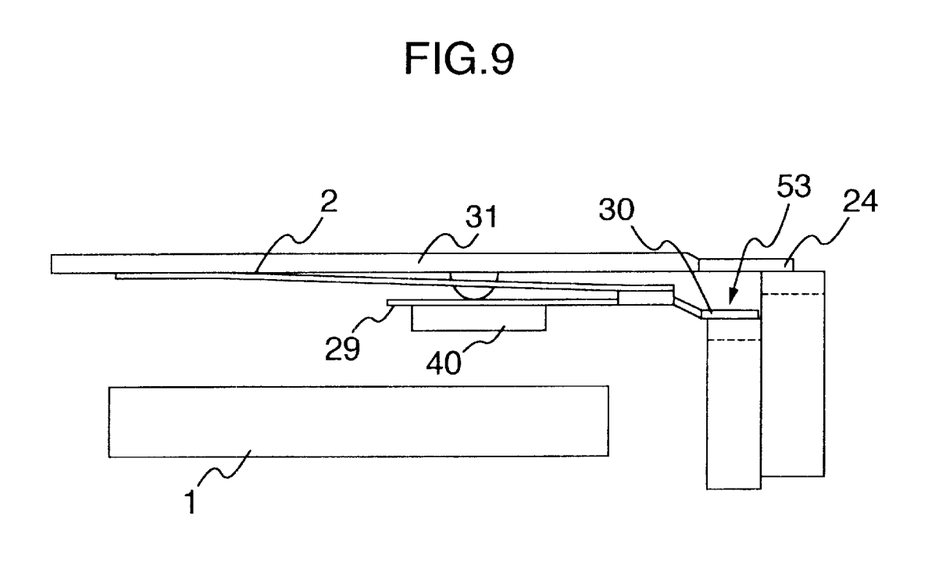
FIG. 9 is a side view showing another tab of the invention.

A third embodiment of the present invention will be described by referring to FIG. 9. The point in which this embodiment differs from the first embodiment is that the second tab 30 is stepped toward the side of the slider's floating surface with respect to the slider mounting portion 29. With this arrangement, it is possible to widen the gap between the first tab and the second tab, reducing the possibility of the two contacting each other and improving the productivity. This embodiment can also produce the effect similar to that of the first embodiment.

Figure 10A:
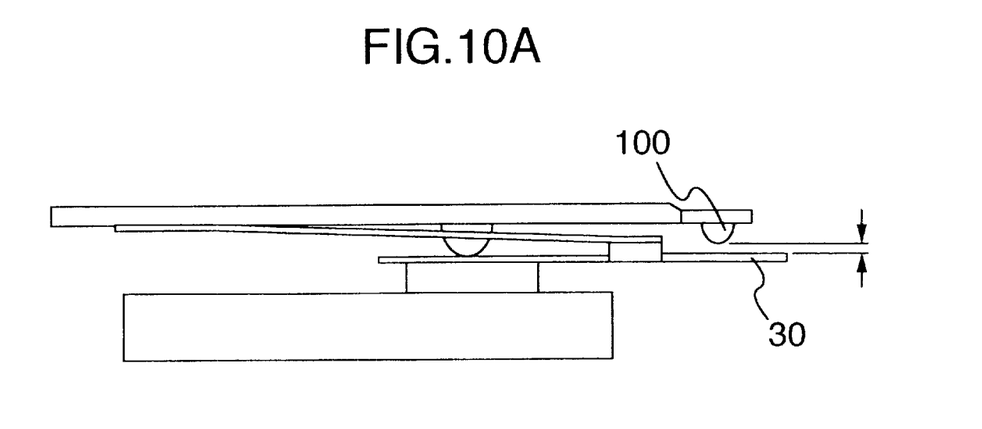
FIG. 10A is a side view showing another tab structure of the invention in a floated state.

A fourth embodiment of the present invention will be described by referring to FIGS. 10A and 10B.

This embodiment differs from the first embodiment in that the first tab and the first ramp are eliminated and only the second tab and the second ramp are provided. Further, the load beam has a second pivot (dowel) 100 at the front end. In the normal floating state, this pivot 100 remains out of contact with the second tab of the gimbals with a predetermined small gap between them, as shown in FIG. 10A. This gap is held at a magnitude such that they do not contact each other when the manufacturing tolerance is considered or when a variety of vibrations are generated during the operation of the disk drive. This gap is set in a range from about 10 $\mu$m to about 50 $\mu$m in this embodiment. The size of this gap, however, depends largely on the machining precision.

Figure 10B:
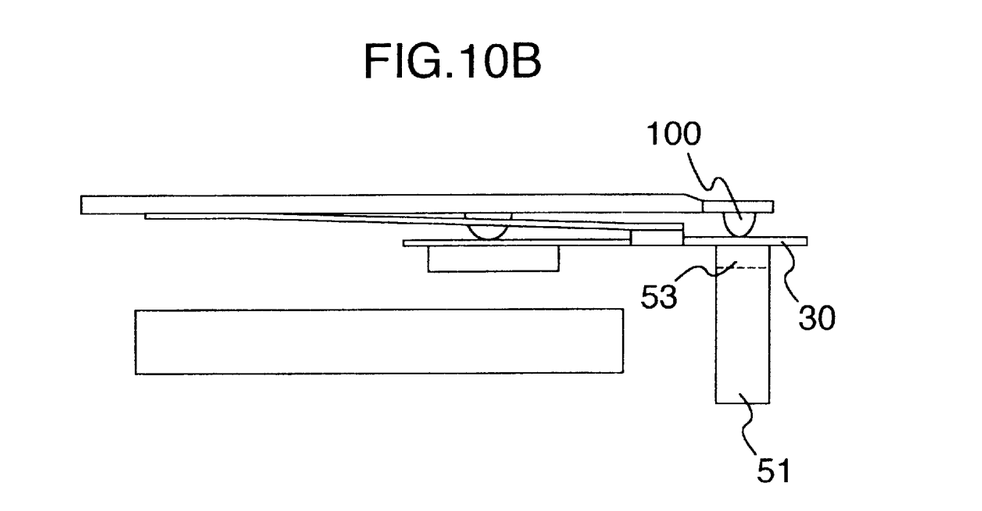
FIG. 10B is a side view showing the tab structure of FIG. 10A resting on the ramp.

FIG. 10B shows the second pivot in contact with the second tab 30 during loading/unloading. When the second tab rides over the second ramp, the front end of the second tab inclines and deforms causing the second tab 30 to contact the second pivot. As a result, the pressing force from the second ramp is transmitted directly to the second pivot of the load beam, without being passed to the gimbals. Therefore the load beam can also be loaded/unloaded by only the second ramp.

This embodiment can thus produce the similar effect to that of the first embodiment. Because the first tab and the second tab can be eliminated, the construction can be made simpler than that of the first embodiment. The second pivot 100 of this embodiment can be formed by pressing, simultaneously with the pivot 23, so additional manufacturing burden is small.

With this invention, if the magnetic head support mechanism for loading/unloading uses a negative pressure slider, the second tab provided to the gimbals and the second ramp can prevent deformation of the gimbals and thus a highly reliable magnetic head support mechanism can be provided. Further, the loading/unloading conditions of the load beam and the slider can be changed freely and independently of each other. This makes it possible to realize a loading/unloading condition suited to a particular purpose.

What is claimed is:

1. A magnetic disk drive comprising:
   a magnetic disk;
   a rotating mechanism to rotate the magnetic disk; and
   a magnetic head support mechanism, the magnetic head support mechanism including:
      a slider having a magnetic head for recording or reproducing information onto or from the magnetic disk;
      a gimbals for supporting the slider; and
      a load beam for supporting the gimbals and being oscillated by a magnetic head positioning drive force;
         wherein the load beam has a first tab extending from a front end thereof and the gimbals has a second tab extending from a front end thereof;
         wherein, when the disk rotation is stopped, a first ramp lifts the first tab of the load beam away from the disk surface and a second ramp lifts the second tab of the gimbals away from the disk surface.

2. A magnetic disk drive according to claim 1, wherein a lubricating film or lubricating agent is applied to one or both of contact sliding surfaces between the first tab and the first ramp and between the second tab and the second ramp.

3. A magnetic disk drive according to claim 1, wherein when the disk stops rotating, the first tab first contacts the first ramp and then the second tab contacts the second ramp.

4. A magnetic disk drive according to claim 1, wherein a length of the first tab is longer than that of the second tab.

5. A magnetic disk drive comprising:
   a magnetic disk;
   a rotating mechanism to rotate the magnetic disk; and
   a magnetic head support mechanism, the magnetic he ad support mechanism including:
      a slider having a magnetic head for recording or reproducing information onto or from the magnetic disk;
      a gimbals for supporting the slider; and
      a load beam for supporting the gimbals and being oscillated by a magnetic head positioning drive force;
         wherein the load beam has a firs t tab extending from a front end thereof and the gimbals has a second tab extending from a front end thereof;
         wherein, when the disk rotation is stopped, a first ramp lifts the first tab of the load beam away from a surface of the magnetic disk and the second tab of the gimbals contacts a second ramp so that a separation force is applied from the second ramp to the second tab of the gimbals to lift the slider in a direction away from the surface of the magnetic disk.

6. A magnetic disk drive according to claim 5, wherein one of a lubricating film and a lubricating agent is applied to at least one of a contact sliding surface between the first tab and the first ramp and a contact sliding surface between the second tab and the second ramp.

7. A magnetic disk drive according to claim 5, wherein when the disk stops rotating, the first tab contacts the first ramp before the second tab contacts the second ramp.

8. A magnetic di s drive according to claim 5, wherein a length of the first tab is longer than a length of the second tab.

* * * * *